(12) United States Patent
Schreiber et al.

(10) Patent No.: US 12,091,250 B2
(45) Date of Patent: Sep. 17, 2024

(54) PARCEL STATION, PARCEL SYSTEM AND METHOD FOR OPERATING A PARCEL STATION

(71) Applicants: HYUNDAI MOTOR COMPANY, Seoul (KR); Kia Corporation, Seoul (KR)

(72) Inventors: Michael Schreiber, Frankfurt am Main (DE); Nico Munkler, Hofheim (DE); Bahman Moarefi, Mainz (DE); Gerrit De Graag, Darmstadt (DE); Jelle Tjebbes, Frankfurt am Main (DE); Joel Dammel, Rüsselsheim (DE); Vitto Bonnemayers, Mainz (DE); Frank Wolf, Dreieich-Sprendlingen (DE); Vincent Laurent, Frankfurt a Main (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 136 days.

(21) Appl. No.: 17/524,175

(22) Filed: Nov. 11, 2021

(65) Prior Publication Data
US 2023/0002159 A1    Jan. 5, 2023

(30) Foreign Application Priority Data
Jul. 1, 2021   (DE) ......................... 102021003398.1

(51) Int. Cl.
*B65G 1/06*     (2006.01)
*B65G 1/127*    (2006.01)
*B65G 1/137*    (2006.01)

(52) U.S. Cl.
CPC ............... *B65G 1/06* (2013.01); *B65G 1/127* (2013.01); *B65G 1/1371* (2013.01)

(58) Field of Classification Search
CPC ......... B65G 1/06; B65G 1/127; B65G 1/1371
See application file for complete search history.

(56) References Cited

U.S. PATENT DOCUMENTS

2019/0344699 A1*  11/2019  Radetzki ................. B62B 3/005
2022/0013045 A1*   1/2022  Takeda .............. B60W 60/0017

FOREIGN PATENT DOCUMENTS

| EP | 0 659 970 A1 | 1/1998 |
| EP | 2 876 614 A1 | 5/2015 |

* cited by examiner

*Primary Examiner* — Saul Rodriguez
*Assistant Examiner* — Willie W Berry, Jr.
(74) *Attorney, Agent, or Firm* — MORGAN, LEWIS & BOCKIUS LLP

(57) ABSTRACT

A parcel station including a housing having a front cover which is slidable along at least one side of the housing which further includes a plurality of segments, and wherein the front cover is configured so that two neighboring segments among the plurality of segments are separable from each other to form an opening in the front; and a plurality of storage plates, which are arranged one above the other in the interior space of the housing with respect to planar extensions thereof and which is movable in a direction perpendicular to the planar extensions and in the upper direction and/or the lower direction, wherein the opening extends between at least two neighboring storage plates among the plurality of storage plates and at current positions thereof.

11 Claims, 8 Drawing Sheets

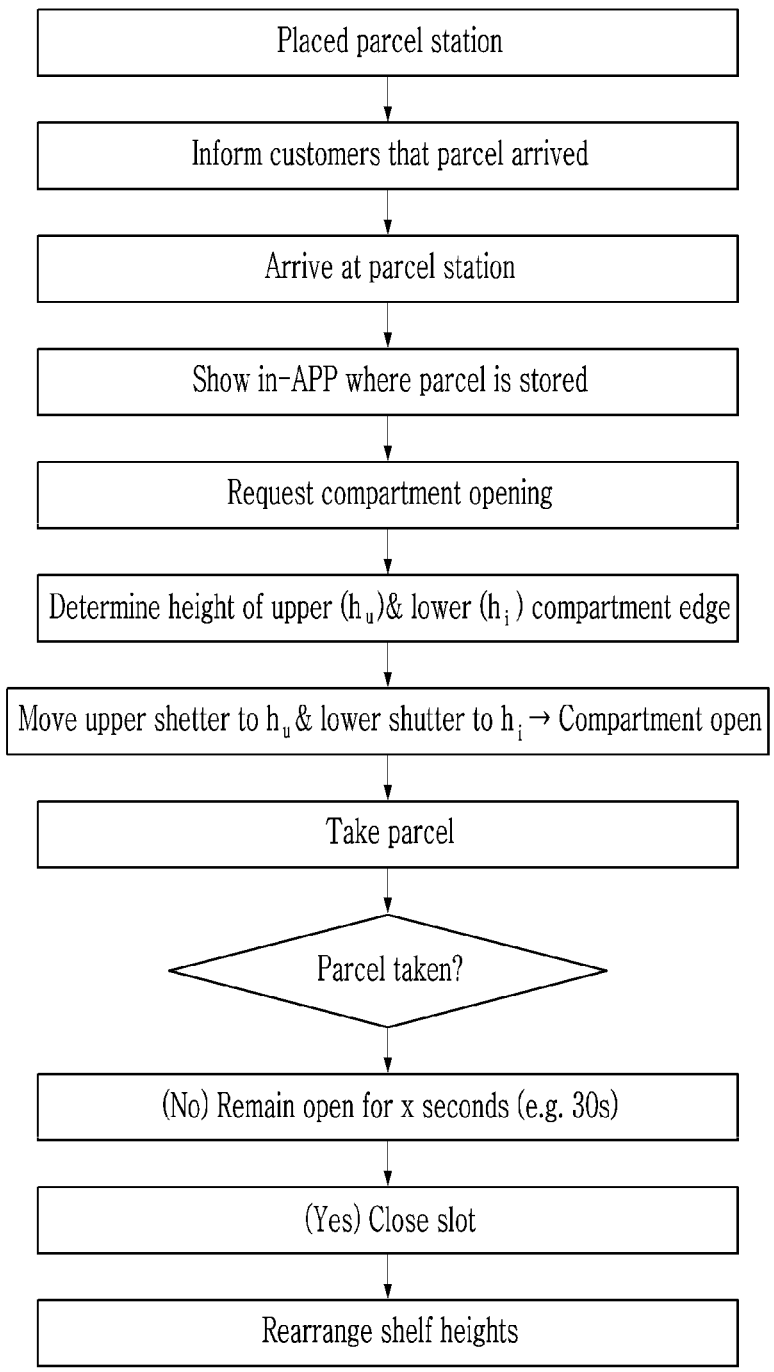

PARCEL STATION, PARCEL SYSTEM AND METHOD FOR OPERATING A PARCEL STATION

CROSS-REFERENCE TO RELATED APPLICATION

The present application claims priority to German Patent Application No. 102021003398.1 filed on Jul. 1, 2021, the entire contents of which is incorporated herein for all purposes by this reference.

BACKGROUND OF THE INVENTION

Field of the Invention

The present invention relates to a parcel station, to a parcel system and to a method for operating a parcel station.

Description of Related Art

Parcel stations face a growing market and there is demand for useful concepts for improving the handling and availability of parcel stations. Known concepts are mostly based on such parcel stations which have a housing and storage departments inside the housing for storing parcels. Typically, these departments have a fixed size and shape and standard sized parcels may be stored inside. It is possible to store parcels of different sizes, wherein the departments for the corresponding sizes are located at positions of the parcel station which have been predefined by the producer of the parcel station and are mostly located at the same place.

Currently department sizes in parcel stations may be selected when logistic companies order a new station.

Once fixed it is often not feasible to change the sizes adaptively to the respective parcel size. Such a system of size adaptation for parcel departments would be of increased interest.

EP 2 876 614 A1 describes a parcel station which includes a parcel lock device for accepting and/or issuing parcels. A transport robot is movably arranged in at least three axes and the electric drive is designed to move the transport robot automatically along the three axes for picking up and dropping off a parcel contained in the parcel lock to one of the plurality of parcels.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a parcel station or a parcel system with an optimization of the space which may be used for the parcels.

Another idea is to provide a parcel station or a parcel system with an improved way of picking up the parcels from the parcel station.

Therefore, various aspects of the present invention are directed to providing a parcel station, a parcel system and a method for operating a parcel station.

Various exemplary embodiments of the present invention are subject of the dependent claims and of the following description, referring to the drawings.

According to a first aspect of the present invention, a parcel station for supplying parcels to a receptor includes a housing having a front cover which is slidable along at least one side, for example a front side, of the housing in an upward direction and/or a downward direction of the housing and which further includes a plurality of segments which are arranged, for example laterally and in upward and downward direction, next to each other along the upward direction and the downward direction when an internal space of the housing is closed by the front cover, and wherein the front cover is configured so that two neighboring segments among the plurality of segments are separable from each other to form an opening in the front cover to the internal and thereby to divide the front cover into an upper portion and a lower portion, wherein the in the upper portion is movable in the upward direction and the lower portion is movable in the lower direction to open the opening in the front cover; and a plurality of storage plates, which are arranged one above the other in the interior space of the housing with respect to planar extensions thereof and which are movable in a direction perpendicular to their planar extension, which can extend horizontally, and in the upper and/or lower direction thereof, wherein the opening extends between at least two neighboring storage plates among the plurality of storage plates and at current positions thereof.

The receptor may be a user which comes to the parcel station for picking up one or several parcels. The receptor can also leave a new parcel at the parcel station in one of the non-occupied departments which may be provided by moving the storage plates to corresponding heights and producing corresponding spaces between the storage plates. The front cover can have a width which is of at least the size of the horizontal extend of the storage plates, which all can have an equal width. The upward direction and the downward direction may be defined perpendicular to the horizontal direction thereof. The front cover may be slidable such that it may be rolled onto a roll in the top and/or bottom area of the housing, for example inside the housing. The housing can have various dimensions, from a few centimeters to few meters in height and/or width (horizontal) and/or length (horizontal). The segments can have a connection mechanism, for example one or more locking pins, by which two segments may be mechanically connected to each other and/or separated and then slided to open the front cover at the expected parcel location. The storing plates may be moved up- and downwards by an actuator or manually.

Various aspects of the present invention are directed to providing a parcel system including at least one parcel station according to various exemplary embodiments of the present invention, which is placed at a fixed position and/or which is mobile.

By the mentioned parcel station it is possible to improve the efficiency of the parcel station itself by making the available space flexible to both small and large packages what in addition thereto considers an improvement of a user experience for users. In the present context the receptor is a user, wherein also the delivering service or person represents a user. Especially smaller persons and wheel chair users of mobile parcel stations can get an improved user experience since their expected parcel may be positioned at a lower height by moving the storage plated accordingly to lower heights of the housing and open a corresponding opening in the front cover also at lower heights. The parcel system may include communication devices and identification and payment systems for operating the parcel business for provider and user.

The parcel station may be placed at the fixed position somewhere in the city and/or on a vehicle.

Parcel stations will get more important in the future due to mobile parcel stations which may get transported and dropped in the city by purpose built vehicles, wherein the parcel station may be mobile and placed or operated by such a purpose built vehicle. A receptor can pick up parcels at a mobile parcel station, when he or she has time, for example after work. By the parcel station the storage size may be adapted between two storage plates and less place wasted inside the housing.

The present invention can also be related to "Purpose Built Vehicle" (PBV) activities, wherein it is very likely that the mid-term future of (autonomous) parcel delivery will face the topic of parcel stations. A (mobile) parcel station therefore has adaptive storage size compartments (space between storage plates) that are adjustable in height to increase the number of packages in the parcel station and to improve the ergonomics of picking up parcels at the station for the end user.

Height adjustment of shelfs (space between storage plates) accompanied by an alternative door concept (segments which may be separated to provide openings in the front cover) may be used to provide access to adaptive size of the parcel station compartment. A double shutter system which is based on segments that can separate and move an upper portion of the front cover and a lower portion of the front cover with counter direction movement is proposed which is able to open a slot at any height and size of the parcel station column.

The height adjustment of the shelfs could be done automatically and thus propelled e.g., by an electric motor. Also a non-motorized version is feasible, where the shelf positions were changed manually or with the help of a device/robot (probably in the logistic center).

The described parcel station with the adaptive storage height can lead to a cost reduction per year. Furthermore, there is a measurable performance development.

There is further an excellent marketability development achieved by the parcel station and its operation method since the parcel station market is growing.

Further there is a high applicability achievable since all functions and components are of reliable technology.

Parcel station may be embodied in PBV or swappable PBV concept (with swappable parcel station). The parcel station may be operated autonomously, wherein PBV or a conventional LCV (light commercial vehicle) drops parcel stations which may be already filled at a desired destination or place.

A (mobile) parcel station therefore can have an adaptive storage size with compartments (departments) that are adjustable in height to increase the number of packages in the parcel station. Once the storage plates are not used they may be moved next to each other, several of them, to provide more free space in the interior space of the housing.

It may be embodied that efficient to improve the ergonomics of picking up parcels at the station for the end user.

A height adjustment of shelfs (storage spaces/departments defined by plates) may be accompanied by an alternative door concept to provide access to adaptive size of the parcel station compartment. A double shutter system (front cover dividable by separating of segments) with counter direction movement is proposed that is able to open a slot at any height and size of the parcel station column.

The height adjustment of the shelfs could be done automatically and thus propelled e.g., by an electric motor. Also a non-motorized version is feasible, where the shelf positions were changed manually or with the help of a device/robot (probably in the logistic center).

Regarding ergonomics, a parcel pick-up at the height of customer needs may be reached, in particular a good height therefore may be between 1.00 m and 1.50 m, and a reallocation feasible after first parcel is picked up is possible.

Regarding efficiency with an adaptive parcel shelf height it is feasible to accommodate more parcels in the same space.

Various aspects of the present invention are directed to providing a method for operating a parcel station for supplying parcels to a receptor, including the steps of providing a parcel station or a parcel system according to the present invention; receive information related to a dimension of a parcel and/or about a receptor and/or about a time of picking up of the parcel; providing a space in the interior space of the housing by moving the at least two neighboring storage plates so that a height according to the dimension of the parcel is provided; opening the front cover by separating two segments and providing the opening at the provided space for the parcel in the interior space, storing the parcel in the provided space and closing the opening; moving the parcel in the interior space to an intermediate position or keeping the parcel at a fixed initial position in the interior space; receiving a command from the receptor to provide an opening for picking up the parcel; and providing an opening at the position of the parcel by separating two neighboring segments in the front cover.

The information regarding the receptor may include the size of the receptor and the favorable height at which the receptor can pick up the parcel, for example tall persons, children or similar. The intermediate position or predetermined fixed initial position may be an average height at which the average sized adult human can most favorably pick up a parcel. The intermediate position may be a predefined or determined height of the housing which may be an average of the favorable heights of the expected receptors for the currently stored parcels, wherein such information may be available from the users when ordering the parcel services.

According to various exemplary embodiments of the parcel station, the front cover is configured such that for closing the opening the upper portion is movable in the downward direction and the lower portion is movable in the upward direction until the opening is closed and the two neighboring segments are connected to each other when closing the opening.

The connection of the segments may be performed/achieved by, for example, at least one locking pin between or at one or both contacting segments which is configured to mechanically interlock or connect the segments in a fixed manner. In the instant way the opening may be easily, manually or automatically, be provided and/or closed at the particular position of the desired parcel for picking up or at the corresponding storage place for receiving the parcel by the station.

According to various exemplary embodiments of the parcel station, the parcel station includes a segment actuator at each segment, wherein the segment actuator is configured to connect and/or disconnect the two neighboring segments from each other.

According to various exemplary embodiments of the present invention, the parcel station includes a plate actuator at each storage plate, wherein the plate actuator is configured to move the storage plates in the upward direction and/or the downward direction inside the interior space of the housing.

The actuators may be operated automatically, for example by an electromotor, or manually.

According to various exemplary embodiments of the present invention, the parcel station includes a controller which is connected to the segment actuator and/or to the plate actuator and which is configured to open and/or close the opening for the parcel and to adjust a height for a parcel in the interior space between two storage plates among the plurality of storage plates by moving at least one storage plate thereof in an upward direction and/or a downward direction thereof.

In the instant way the size of the particular department may be provided.

According to various exemplary embodiments of the present invention, the parcel station includes a communication unit connected to the controller and configured to receive or transmit information to a user and/or receptor about a parcel and/or a size of the parcel and/or about a favorable height position of the parcel in the interior space of the housing according to a user profile.

The mentioned information for communication to the controller may be provided by the receptor when ordering the parcel service. Then a preordering of parcels when filling the station may be done, wherein the parcels may be sorted from top to bottom or vice versa depending on their height and/or weight and may be stored from bottom to top with decreasing weight or by favorable picking up height of the receptor or in any other favorable order.

According to various exemplary embodiments of the present invention, a plurality of parcels is registered to corresponding receptors and that dimensions and time of expected picking up of the parcels are registered, and that the parcels are sorted and/or placed in the interior space depending on height thereof and the time of expected picking up.

The height position may be adapted after the first parcel is picked up, for example the parcels above and below the department of the first parcel may be moved closer to an average favorable picking up height which can represent an average of the expected receptors. The expected picking up may be performed, for example, by predictive learning based on customers pick-up patterns.

According to various exemplary embodiments of the present invention, a parcel which is expected to be picked up first among the plurality of parcels is initially placed at a most favorable height for picking up the parcel expected to be picked up first, wherein the plurality of storage plates is arranged to provide corresponding spaces for the plurality of parcels, wherein the size of the receptor is received and the most favorable height for picking up the corresponding parcel is determined for the corresponding receptor, and that parcels which are expected to be picked up in consecutive temporal order are initially placed in a consecutive order in the upward direction or the downward direction next to the first parcel.

According to various exemplary embodiments of the present invention, after the first parcel is picked up the opening is closed and the space of the first parcel is, at least partially, occupied by the space of the parcel which is expected to be picked up next by moving the corresponding storage plates and at least the next parcel in an upward direction and/or a downward direction to position the next parcel at a most favorable height of the next receptor.

The favorable (picking up) height may be a predefined value or range or may be submitted by the receptor or customer when the parcel is ordered or it may be already known from the customer settings or determined or already known for average sized persons. The favorable height can correspond to such a height above ground that the posture of the receptor or customer when picking up or placing the parcel in the parcel station is most optimized regarding health and power for lifting the parcel.

According to various exemplary embodiments of the present invention, the parcels in the interior space are initially arranged as close as possible to a predetermined most favorable height for picking up thereof, wherein after one parcel is picked up remaining spaces of remaining parcels among the plurality of parcels are placed next to each other and each as close as possible to the most favorable height for picking up.

According to various exemplary embodiments of the present invention, the opening opens automatically after the receptor gives a command for picking up a parcel or the opening is opened manually by the receptor at a position at the front cover which corresponds to a position of the predetermined parcel and which is indicated to the receptor.

The method may be subject to similar advantages and properties as already mentioned in conjunction with the parcel station.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A, FIG. 5B and FIG. 5C show flowcharts of methods according to exemplary embodiments of the present invention.

Unless indicated otherwise, like reference signs to the figures indicate like elements.

Figure 1:
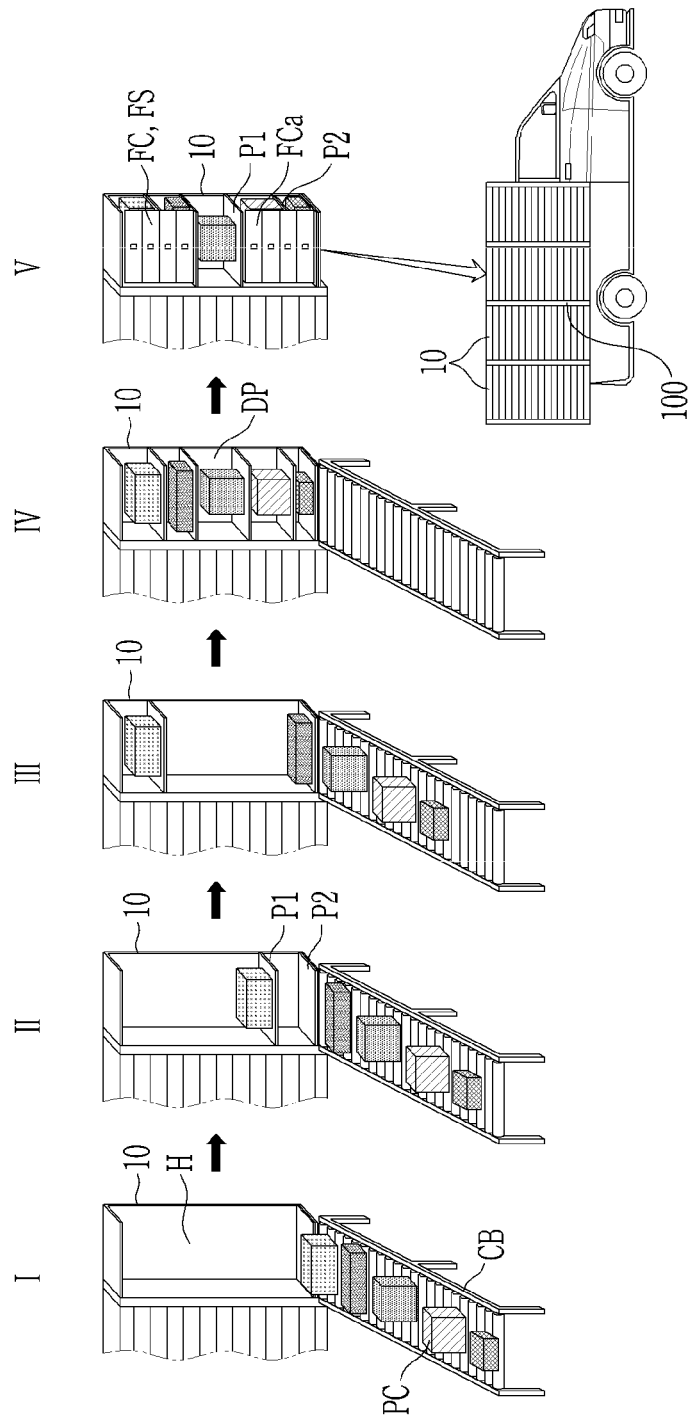
FIG. 1 shows a parcel station and a method for placing parcels inside the parcel station according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

FIG. 1 exemplarily shows a view on a vehicle defining velocity components and a side slip angle according to various exemplary embodiments of the present invention.

FIG. 1 exemplarily shows a parcel station and a method for placing parcels inside the parcel station according to various exemplary embodiments of the present invention.

The parcel station 10 for supplying parcels to a receptor, includes a housing H.

A preordering of parcels with regard to the expected order of receptors may be done and the parcel station and storage departments thereof may be filled with parcels, wherein a conveyor belt CB may be used to transport the parcels to the provided storage spaces (departments DP).

In step I the housing H has yet no provided storage departments but the parcels PC are preordered already and may be moved toward the housing by the belt CB. The first parcel to be stored is then placed on a first storage plate P1 (step II). Then the corresponding storage plate with the parcel moves upwards and provides another space (department) below it for the next parcel which is then placed on the next (lower) storage plate (second) and between the first and second storage plates P1 and P2 at a correspondingly provided space with a height for the second parcel (step II). It is also possible to move first parcel to the top portion of the housing and then move the second parcel next to it as shown in step III and IV.

Furthermore, the second and the first parcel move upwards with the corresponding storage plates with them to provide a third space for the third parcel with a corresponding height between the second storage plate and the third storage plate below it, and the like for several storage plates and parcel heights (step IV).

As shown in step V the parcel station has a front cover FC which is slidable along at least one side, for example a front side FS, of the housing in an upward direction and/or a downward direction of the housing and which further includes a plurality of segments (FCa, FCb, . . . , FCn) which are arranged laterally next to each other along the upward direction and the downward direction when an interior space of the housing is closed by the front cover FC. The front cover is configured so that two neighboring segments among the plurality of segments are separable from each other to form an opening in the front cover FC to the interior space of the housing and thereby to divide the front cover into an upper portion and a lower portion, wherein the upper portion is movable in the upward direction and the lower portion is movable in the lower direction to open the opening in the front cover FC; and a plurality of storage plates (P1, P2, . . . , Pn), which are arranged one above the other in the interior space of the housing with respect to planar extensions thereof and which is movable in a direction perpendicular to the planar extensions and in the upper and/or lower direction thereof, wherein the opening extends at least between two neighboring storage plates among the plurality of storage plates and at current positions thereof.

The front cover FC may be closed when the segments are moved from the lower portions and upper portions towards each other and then open, when needed, at the particular position of the desired parcel for picking it up and providing it to the receptor.

In an alternative embodiment it is also possible to place the conveyor belt CB close to the top portion of the housing or at the middle of the height of the housing and fill the parcel station from this position.

Each column is loaded individually, several parcel stations can move horizontally for filling.

A preorder of parcels may be done in the logistic center portion in terms of expected pickup time of customer, height of customer, weight of parcels (no heavy items in upper shelf).

Several parcel stations 10 may be placed on a vehicle as part of a mobile parcel system 100.

Figure 2:
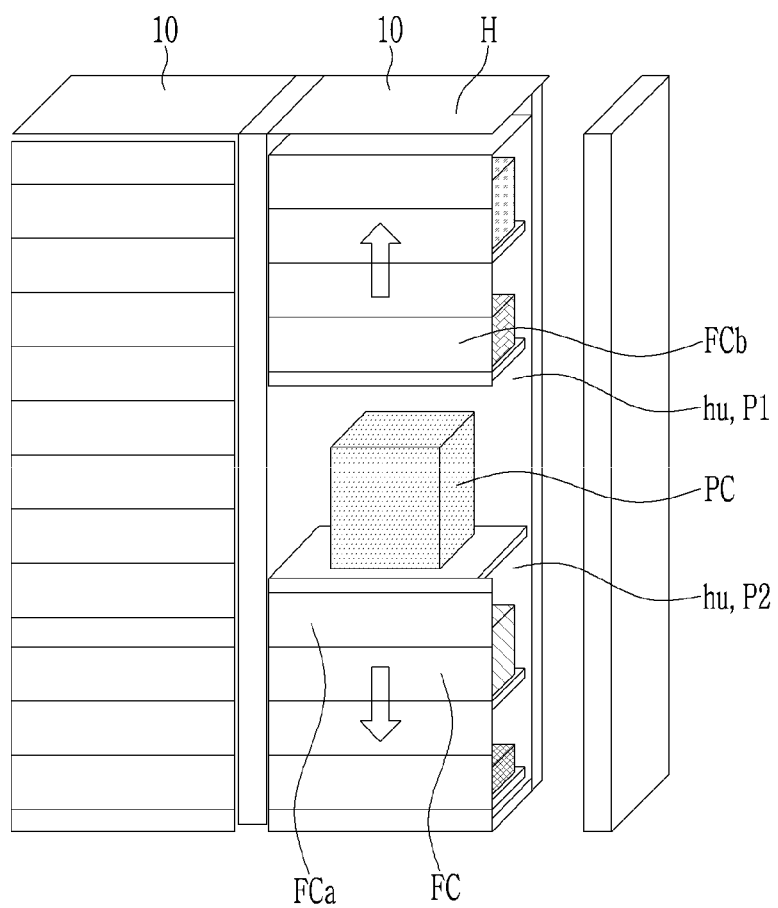
FIG. 2 shows details of a parcel station according to various exemplary embodiments of the present invention.

FIG. 2 exemplarily shows details of a parcel station according to various exemplary embodiments of the present invention.

In FIG. 2 two parcel stations 10 are shown which are placed next to each other, wherein one is shown to be closed and the other is open having an opening in the front cover FC at the position of the particular parcel PC which is desired to be picked up, for example at a favorable height for the receptor and approximately in the middle of the housing H between its top and bottom.

The front cover FC with segments thereof can separate the segments FCa and FCb at the position of the desired parcel PC from each other, wherein the upper portion of the front cover can move upward (arrow) and the lower portion can move downward (arrow), in particular automatically or manually. The segments may be separated by releasing a connection pin or by opening any other locking mechanism for the segments. The upper storage plate P1 can move up to an upper position hu of the particular department for the parcel and the lower storage plate P2 can move down to a lower position hi providing the corresponding height of the particular parcel between the storage plates P1 and P2. Such an arrangement of departments with corresponding heights may be achieved also by the other storage plates and for the other parcels and at each such parcel position the corresponding opening in the front cover may be provided by separating the segments and moving the upper portion and the lower portion to corresponding positions to provide the corresponding size of the opening. The upper portion and/or the lower portion of the front cover FC may be rolled on a top and/or bottom portion of the housing or slide along the walls of the housing at bottom and/or top. The upper shutter FCb (segment) can move to an upper edge portion of the compartment (hu); the lower shutter FCa can move to the lower edge portion of compartment (hi); the shutters (segments) can move together until upper or lower edge portion of compartment is reached. The parcel may be picked up at a good ergonomic position. After the customer is moving away with the parcel the segments may be closed again.

Figure 3:
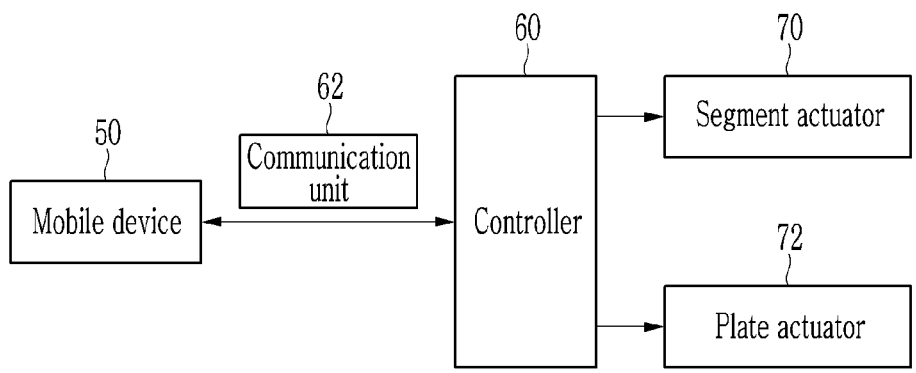
FIG. 3 shows a block diagram of a parcel station according to various exemplary embodiments of the present invention.

FIG. 3 shows a block diagram of a parcel station according to various exemplary embodiments of the present invention.

As shown in FIG. 3, the parcel station according to various exemplary embodiments of the present invention includes a mobile device 50, a controller 60, a segment actuator 70 and a plate actuator (72).

The mobile device 50 can be mobile device such as a smartphone of a user or the receptor and configured to transmit commanders of the receptor or a user profile to the controller 60.

The segment actuator 70 is configured to connect and/or disconnect the two neighboring segments from each other and is included at each segment.

The plate actuator 72 is configured to move the storage plates in the upward direction and/or the downward direction inside the interior space of the housing H and is included at each storage plate.

The controller 60 is connected to the segment actuator 70 and configured to open and/or close the opening for a parcel and to adjust a height for the parcel in the interior space between two storage plates among the plurality of storage plates by moving at least one storage plate thereof in the upward direction or the downward direction.

In addition, the controller 60 is connected to the plate actuator 72 and configured to open and/or close the opening for a parcel and to adjust a height for the parcel in the interior space between two storage plates among the plurality of storage plates by moving at least one storage plate thereof in the upward direction or the downward direction.

In addition, the parcel station 10 further includes a communication unit 62 communicatively connecting the controller 60 and the mobile device 50. The communication unit 62 is connected to the controller 60 and configured to receive or transmit information to the user and/or the receptor about the parcel and/or a size of the parcel and/or about a favorable height position of the parcel in the interior space of the housing according to a user profile.

Figure 4A:
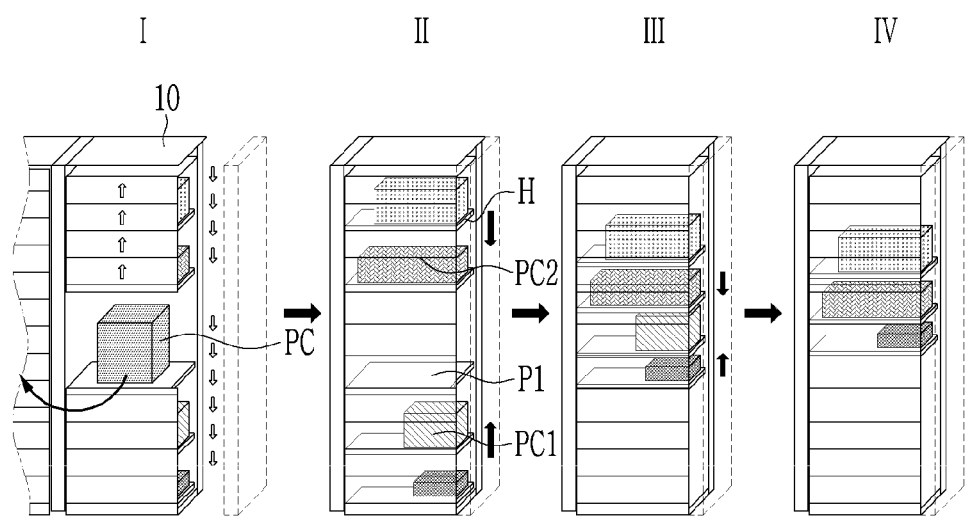
FIG. 4A shows a method of rearrangement of parcels after pick up according to various exemplary embodiments of the present invention.

FIG. 4A exemplarily shows a method of rearrangement of parcels after pick up according to various exemplary embodiments of the present invention.

The described rearrangement may be done directly after pick up of a (first or later picked up) parcel.

In step I the parcel station 10 is filled with parcels PC and an opening is provided at the particular position at which the desired parcel then may be picked up by the receptor. The parcel station may be filled and placed somewhere in public, for example in the city. The customer arrives at the parcel stations to pick up a parcel and request to open compartment (e.g., on smartphone).

Step II shows that after the first parcel has been picked up the remaining parcels and their departments start to rearrange before the next parcel is picked upwards. In this sense the storage plates P1 and P2, which have defined the height of the department for the first parcel start moving towards each other so that the upper parcels are positioned at lower positions and the lower parcels are positioned at higher positions and all of them closer to a predetermined favorable height of an average user, wherein it is also possible to predefine any other favorable height position to which the parcels after rearrangement may be positioned as close as possible. The set of parcels, either the lower ones or the upper ones, which are closer to the predefined favorable height after the first parcel is picked up, can move less fast than the other set which is then further from the favorable height position. This is shown in step III of FIG. 4A. Then another parcel is picked up and the same rearrangement happens for the remaining parcels as shown in step IV. In the instant way mostly the best ergonomic position or any other predetermined position may be reached for some or all parcels (in average or really).

Figure 4B:
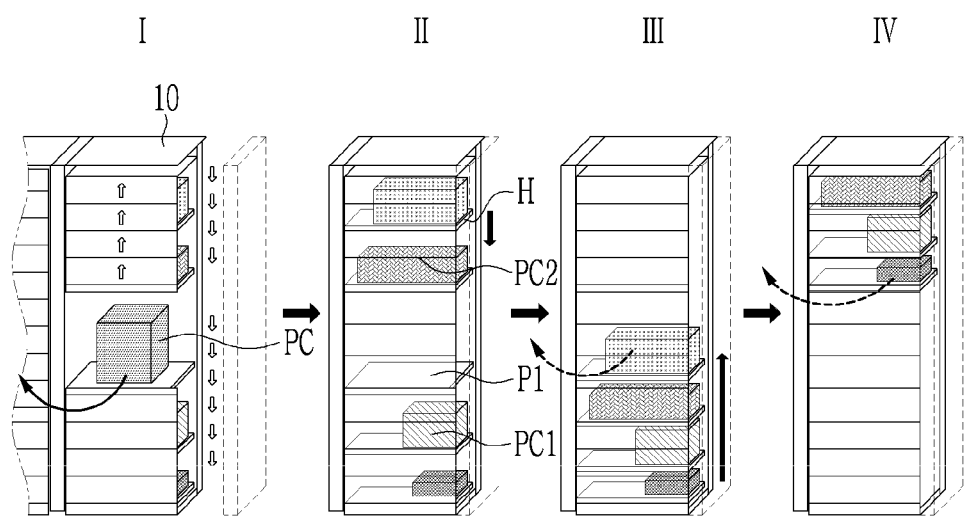
FIG. 4B shows a method of rearrangement of parcels after pick up according to another exemplary embodiment of the present invention.

FIG. 4B exemplarily shows a method of rearrangement of parcels after pick up according to another exemplary embodiment of the present invention.

Step I is similar to step I of FIG. 4A but the following rearrangement method is different. In step II the rearrangement starts only when the next receptor arrives and/or gives a command to open the opening for the particular parcel. Step II shows the example that the next receptor has the parcel which is placed on top of all parcels, then the upper parcels and their departments may be moved rapidly downwards and position the uppermost one as close to the most favorable height position of the current receptor as possible, the lower set of parcels can remain unmoved. When the next receptor arrives, step III shows the example that the receptor has the most lower parcel and then all parcels are moved upward rapidly until the lowest parcel comes as close to the favorable height of the current receptor as possible to open an opening there, what corresponds to the position in step IV.

Figure 5B:
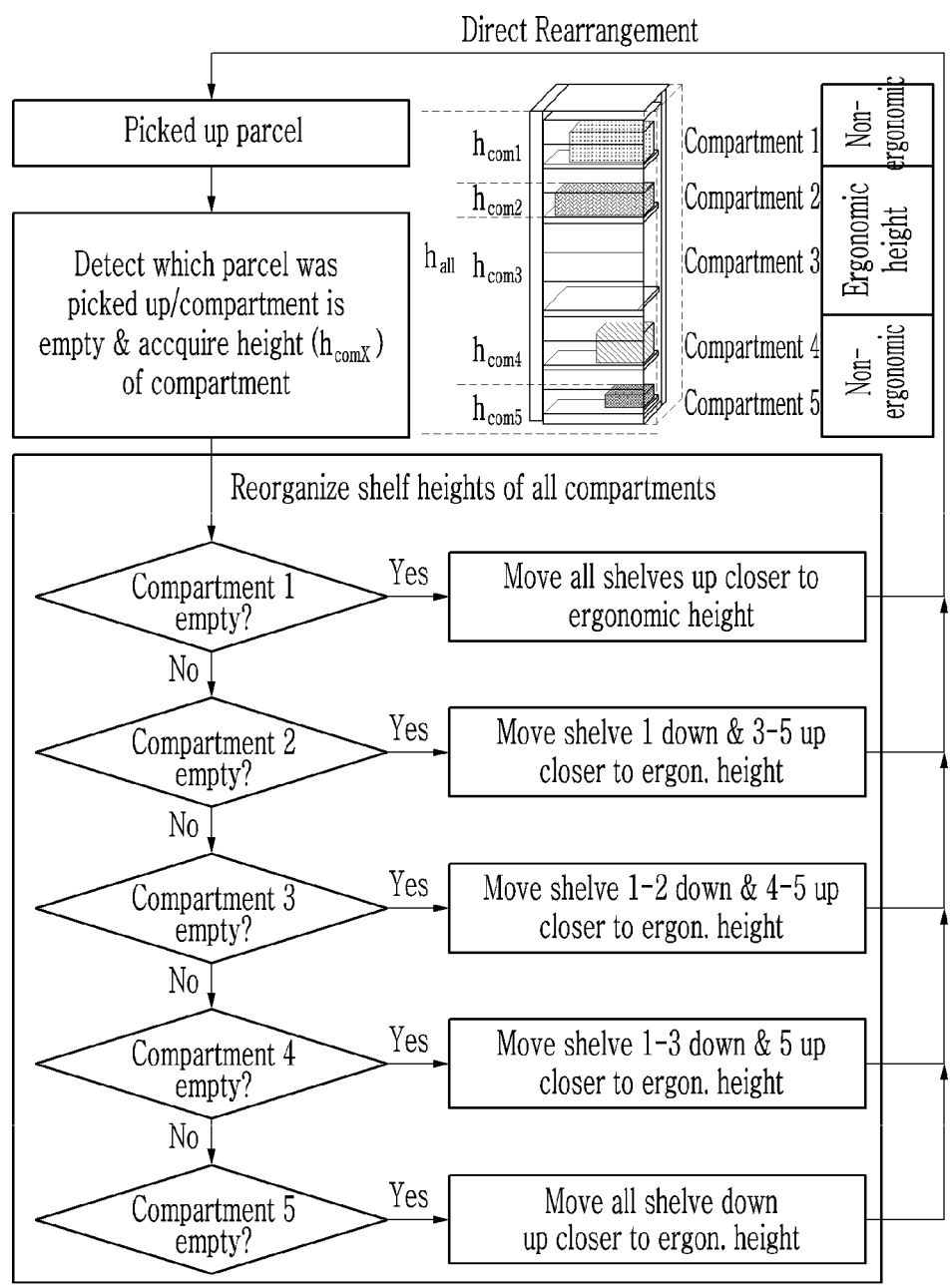
Figure 5C:
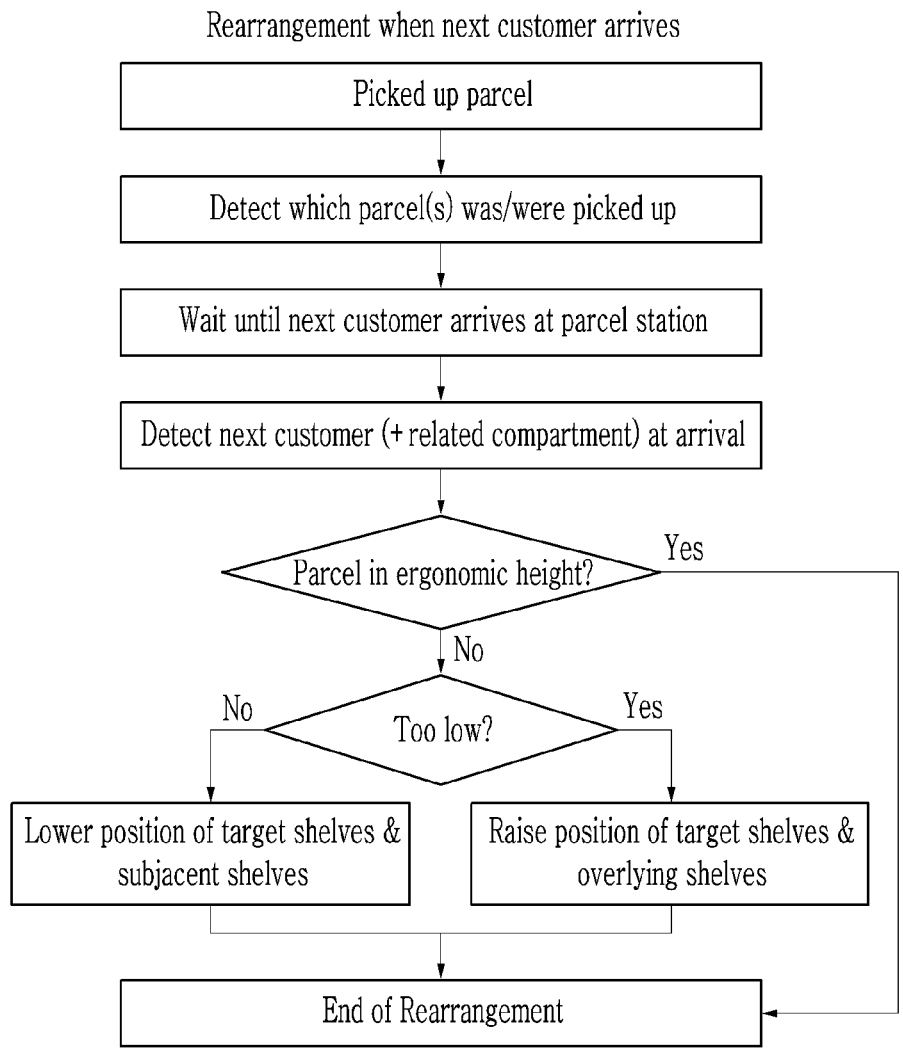

FIG. 5A, FIG. 5B and FIG. 5C exemplarily show flowcharts of a method according to exemplary embodiments of the present invention.

FIG. 5A shows an exemplary embodiment of the method as a flowchart which describes the possible pick-up process.

A routine, for example executed by a controller configured for the front cover and for an actuator for the storage plates, can correspond to the following steps:

When the parcel station is placed, the customers may be informed about that the parcel arrived. When the receptor (customer) arrives at the parcel station, it may be show in an application of a mobile electronic device where the parcel is stored. The customer then can request the opening of the compartment. The system can determine the needed height of the upper (hu) and lower (hi) compartment edge and move the upper (segment) shutter to hu and the lower shutter to hi and open the compartment (storage place for the desired parcel). Then the controller can prove whether the parcel has been taken. If not, the opening can remain open for x seconds (e.g., 30 s), for the case that it has been taken the opening can close. The storage plates (shelfs) can rearrange.

FIG. 5B shows an exemplary embodiment of the method as a flowchart which describes the possible rearrangement process after pick up.

In FIG. 5B a direct rearrangement after pick up is described.

After a parcel is picked up it may be detected (by a controller) which parcel was picked up and which compartment is empty and it is then possible to acquire the height (hcomX) of this compartment. Then it is possible to reorganize shelf heights and positions of all compartments.

For the case that it is recognized that compartment 1 (uppermost) is empty, all shelves (storage plates) below the uppermost may be moved up and closer to ergonomic height. For the case that not, it is checked whether the next compartment from top, compartment 2, is empty or not. If yes, then shelve 1 is moved down and shelves 3-5 (for the case of 5 compartments but also more or less are possible) are moved up and closer to ergonomic height. The numbering increases in the instant case from top of the housing of the parcel station downwards. If compartment 2 is not empty, then it is checked whether compartment 3 is empty. If yes, shelves 1-2 move downwards and shelves 4-5 move up closer to ergonomic height. If not, it is checked whether compartment 4 is empty. If yes, then shelves 1-3 are moved down and shelf 5 is moved up closer to ergonomic height. If not, it can be checked whether compartment 5 is empty. If yes, all shelves move down or up and closer to ergonomic height. Afterwards, the system can wait for pick up of another parcel and start the routine again. The restart of the routine may be done after each intermediate movement and succeeding pick up of next parcel.

FIG. 5C shows an exemplary embodiment of the method as a flowchart which describes the possible rearrangement process when the next receptor arrives.

In FIG. 5C a rearrangement is described which starts when the next customer arrives or when the next parcel is ordered for pick up.

When a parcel is picked up, it may be detected which parcel(s) was/were picked up. Then the station can wait until the next customer arrives at the parcel station and the next customer and the related compartment may be detected upon arrival. It can then be checked whether the parcel is at ergonomic height. For the case of yes, this means the end of rearrangement. If not, it may be detected whether the position is too low. If yes, the storage plates can raise the position of target shelves (storage plates) and of the overlying shelves. If not, the system can lower the position of target shelves and subjacent shelves. Afterwards the end of rearrangement is reached.

The detection of the arrival and further information related to the receptor may be done by a smartphone input (in app), IoT (internet of things), by the detection of a device which is approaching (known detection methods), the device may be a user smartphone, or by recognizing a fingerprint.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parcel station for supplying parcels to a receptor, the parcel station comprising:
    a housing having a front cover which is slidable along at least one side of the housing in an upward direction and/or a downward direction of the housing,
        wherein the front cover includes a plurality of segments, each being slidable along the at least one side of the housing in the upward direction and/or the downward direction of the housing,
        wherein the plurality of segments is arranged and connected next to each other along the upward direction and the downward direction when an interior space of the housing is closed by the front cover,
        wherein the front cover is configured so that two neighboring segments among the plurality of segments are disconnectable from each other to form an opening in the front cover to the interior space of the housing and thereby to divide the front cover into an upper portion and a lower portion,
        wherein the upper portion is movable in the upward direction and the lower portion is movable in the lower direction to open the opening in the front cover; and
    a plurality of storage plates, which is arranged one above the other in the interior space of the housing and each of which is movable in the upper direction and/or the lower direction,
    wherein the opening extends between at least two neighboring storage plates among the plurality of storage plates and at current positions thereof,
    wherein the parcel station further includes a segment actuator at each segment, wherein the segment actuator is configured to connect and/or disconnect the two neighboring segments from each other,
    wherein the parcel station further includes a controller which is connected to the segment actuator and which is configured to open and/or close the opening for a parcel and to adjust a size of the opening for the parcel,
    wherein the parcel station further includes a communication unit connected to the controller and configured to receive or transmit information to a user and/or the receptor about the parcel and/or a size of the parcel and/or about a favorable height position of the parcel in the interior space of the housing according to a user profile,
    wherein the parcel station further includes a plate actuator at each storage plate, wherein the plate actuator is configured to move the storage plates in the upward direction and/or the downward direction inside the interior space of the housing, and
    wherein the controller is configured to control the plate actuator to provide a height according to the size of the parcel at the favorable height position of the parcel according to the user profile by moving an upper storage plate of two neighboring storage plates at the favorable height position in the upward direction and a lower storage pate of the two neighboring storage plates in the downward direction, and to control the segment actuator to open or close the opening according to the height and a position of the parcel by moving the upper portion of the front cover at the favorable height position in the upward direction and the lower portion of the front cover at the favorable height position in the downward direction.

2. The parcel station of claim 1, wherein for closing the opening the upper portion of the front cover is movable in the downward direction and the lower portion of the front cover is movable in the upward direction until the opening is closed and the two neighboring segments are connected to each other when closing the opening.

3. The parcel station of the claim 1, further including the controller which is connected to the plate actuator and configured to adjust a height for the parcel in the interior space between two storage plates among the plurality of storage plates by moving at least one storage plate thereof in the upward direction or the downward direction.

4. A parcel system comprising:
    at least one a parcel station of the claim 1, which is placed at a fixed position and/or which is mobile.

5. A method for operating the parcel station of claim 1 for supplying the parcels to the receptor, the method comprising the steps:
    providing the parcel station or a parcel system,
    receive information related to a dimension of the parcel and/or about the receptor and/or about a time of picking up of the parcel;

providing a space in the interior space of the housing by moving the at least two neighboring storage plates so that the height according to the dimension of the parcel is provided at the favorable height position of the parcel according to the user profile;

opening the front cover by separating two segments among the plurality of segments and providing the opening at the provided space for the parcel in the interior space, storing the parcel in the provided space and closing the opening;

moving the parcel in the interior space to an intermediate position or keeping the parcel at a fixed initial position in the interior space;

receiving a command from the receptor to provide the opening for picking up the parcel;

moving the parcel to the favorable height position of the parcel according to the user profile; and providing the opening at the favorable height position of the parcel by separating the two neighboring segments in the front cover.

6. The method of claim 5, wherein the parcels are registered to corresponding receptors, dimensions and time of expected picking up of the parcels are registered, and the parcels are sorted and/or laced in the interior space depending on height thereof and the time of expected picking up.

7. The method of claim 6, wherein after a first parcel among the parcels is picked up the opening is closed and a space of the first parcel is occupied by a space of another parcel among the parcels, which is expected to be picked up next by moving corresponding storage plates among the plurality of storage plates and at least a next parcel among the parcels in the upward direction and/or the downward direction to position the at least a next parcel at a most favorable height of a next receptor.

8. The method of claim 6, wherein a first parcel which is expected to be picked up first among the parcels is initially placed at a most favorable height for picking up the first parcel expected to be picked up first, wherein the plurality of storage plates is arranged to provide corresponding spaces for the parcels, wherein a size of the receptor is received and a most favorable height for picking up a corresponding parcel is determined for a corresponding receptor, and wherein predetermined parcels which are expected to be picked up in consecutive temporal order, among the parcels are initially placed in a consecutive order in the upward direction or the downward direction next to the first parcel.

9. The method of claim 8, wherein after the first parcel among the parcels is picked up the opening is closed and a space of the first parcel is occupied by a space of another parcel among the parcels, which is expected to be picked up next by moving corresponding storage plates among the plurality of storage plates and at least a next parcel among the parcels in the upward direction and/or the downward direction to position the at least a next parcel at a most favorable height of a next receptor.

10. The method of claim 6, wherein the parcels in the interior space are initially arranged as close as possible to a predetermined most favorable height for picking up thereof, and wherein after one parcel among the parcels is picked up remaining spaces of remaining parcels among the parcels are placed next to each other and each as close as possible to the redetermined most favorable height for picking up thereof.

11. The method of claim 5, wherein the opening opens automatically after the receptor gives a command for picking up a predetermined parcel among the parcels or the opening is opened manually by the receptor at a position at the front cover which corresponds to a position of the predetermined parcel and which is indicated to the receptor.

* * * * *